Dec. 15, 1936.  W. J. LANGER  2,064,668
FERTILIZER ATTACHMENT FOR HAND CORN PLANTERS
Filed Jan. 21, 1936
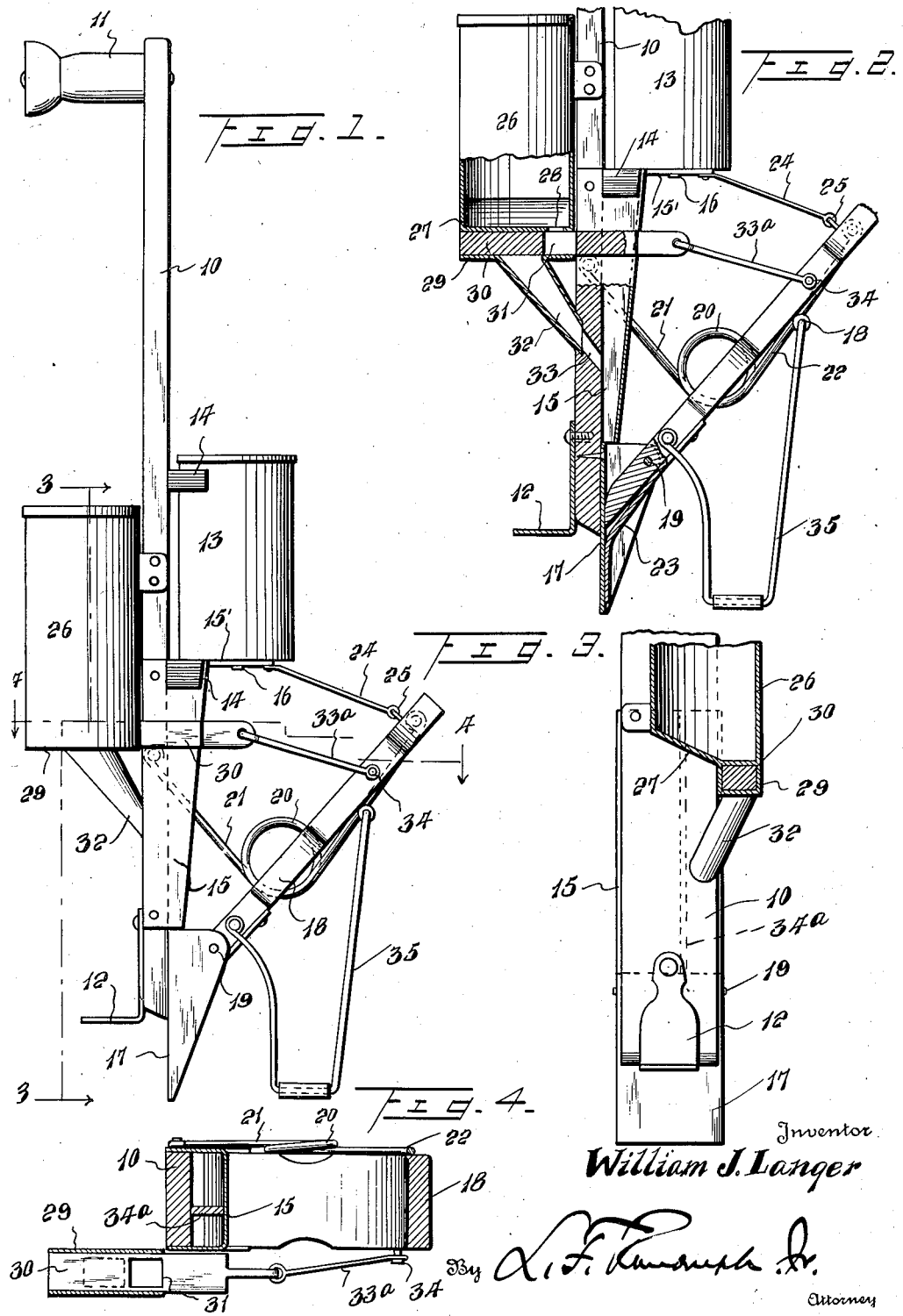
Inventor
William J. Langer
Attorney Patented Dec. 15, 1936

2,064,668

UNITED STATES PATENT OFFICE 2,064,668

FERTILIZER ATTACHMENT FOR HAND CORN PLANTERS

William J. Langer, Gobles, Mich.

Application January 21, 1936, Serial No. 60,104

1 Claim. (Cl. 111—98)

This invention relates to an attachment for hand planters for corn, beans, or the like.

It is particularly aimed to provide a novel and efficient construction whereby fertilizer will be deposited simultaneously with the seed but out of contact therewith.

The more specific objects and advantages will become apparent from a consideration of the description following taken in connection with accompanying drawing illustrating an operative embodiment.

In said drawing:—

Figure 1 is a view of the device in side elevation;

Figure 2 is a view of the lower portion thereof partly in section and partly in elevation;

Figure 3 is a vertical sectional view taken on the line 3—3 of Figure 1, and

Figure 4 is a horizontal sectional view taken on the line 4—4 of Figure 1.

A vertical staff, plate or post, usually of wood, is shown at 10 equipped with a handle 11 adjacent to top and with a foot rest and gage 12 adjacent to bottom thereof. At one side, said staff 10 carries a hopper 13 for the seed or material to be planted, the hopper being secured to block 14 directly fastened to the staff. A discharge chute 15 is fastened against one side of the staff 10 to receive the seed or corn discharged from the hopper 13 under control of a rotary valve member 15' pivoted on a vertical axis 16 to the hopper. The hopper and valve may be of any well known construction and specifically forms no part of the invention.

Below the chute 15 and in communication therewith is a shoe 17 of U-shape in cross section to the side of which a lever 18 is pivoted on a horizontal axis 19 and which lever is urged into contact with the main wall of such shoe through the expansive action of a coil spring 20 having arms 21 and 22 fastened to the staff 10 and the lever 18. Said lever 18 at its lower end carries a plate 23 which intimately closes against the main wall of shoe 17. A link 24 is pivoted to the valve plate 15' and at 25 to the upper end of the lever 18 so that movement of the lever towards the staff 10 will actuate the valve plate 15' to discharge seed into the chute 15.

On the side of staff 10 opposite to hopper 13, is a hopper 26 adapted to contain fertilizer such hopper having its bottom wall for the most part at 27, inclining towards discharge opening 28 therein indicating with a horizontal tubular portion 29, preferably square in cross sections, and slidably mounting a slidable valve 30 having an opening or pocket 31 therein adapted to normally register with opening 28, and be moved into a discharging position where it registers with a chute 32 leading to an opening 33 in the staff 10 and communicating with the interior of chute 15. Said valve 30 is preferably metallic and is provided with a wooden core.

Said valve 30 extends across one side of the staff 10 and has a link 33a pivoted thereto and pivoted at 34 to the lever 18.

It will be noted that a divider or partition 34a is provided within the chute 15, so that the corn or other seed and the fertilizer will be discharged into separate passages or channels and thus fall through the shoe 17 onto the ground, without admixture, to the end that the fertilizer will not injuriously contact the seed but will be sufficiently close thereto.

It will be realized that in planting, the shoe 17 and plate 23 and a depending wire frame 35 on lever 18, enter the hole or furrow to the extent permitted by contact of gage 12 with the ground. The device is then tilted so that a contact of frame 35 with the base of the furrow or hole will cause the upper end of lever 18 to move toward the staff 10 while the opposite end of such lever moves away from the staff. At the same time, links 24 and 33 move the valves 15' and 30, so that seed and fertilizer are discharged into the chute 15 on opposite sides of the partition or divider 34a, falling therethrough, through the shoe 17 and onto the ground.

Various changes may be resorted to provided they fall within the spirit and scope of the invention.

I claim as my invention:—

A device of the class described comprising a staff, a hopper thereon for seed, a hopper thereon for fertilizer, a chute of U-shape having its side walls secured to the staff, a valve for the first hopper controlling the supply of seed to the chute, a discharge tube leading from the second hopper at one side of center thereof through the staff to said chute, said second hopper having a bottom inclining to said chute, a valve controlling the discharge from the second mentioned hopper, said valve extending across one side of the chute, a shoe below the chute into which the chute discharges, a lever pivoted to the shoe and normally closing the same, a ground engaging frame carried by the lever, spring means urging the lever to closed position, and connections from the lever to said valves to operate them through operation of the lever, said chute having a divider therein whereby the seed and fertilizer will be dropped without admixture, and a plate carried by the lower end of said lever provided with a vertical portion normally having closing engagement with said shoe.

WILLIAM J. LANGER.